(12) United States Patent
Xu

(10) Patent No.: US 11,979,837 B2
(45) Date of Patent: May 7, 2024

(54) POWER CONTROL METHOD, RANDOM ACCESS METHOD APPARATUSES, AND TERMINAL

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 367 days.

(21) Appl. No.: 17/463,311

(22) Filed: Aug. 31, 2021

(65) Prior Publication Data

US 2021/0392589 A1    Dec. 16, 2021

Related U.S. Application Data

(63) Continuation of application No. PCT/CN2019/077379, filed on Mar. 7, 2019.

(51) Int. Cl.
*H04W 52/14* (2009.01)
*H04W 52/36* (2009.01)
*H04W 74/0833* (2024.01)

(52) U.S. Cl.
CPC ........ *H04W 52/146* (2013.01); *H04W 52/36* (2013.01); *H04W 74/0841* (2013.01)

(58) Field of Classification Search
None
See application file for complete search history.

(56) References Cited

U.S. PATENT DOCUMENTS

| 9,832,732 | B2 * | 11/2017 | Ouchi | H04W 52/245 |
| 2009/0186613 | A1 | 7/2009 | Ahn | |
| 2013/0070696 | A1 | 3/2013 | Tang | |
| 2014/0177531 | A1 * | 6/2014 | Imamura | H04L 5/0048 |
| | | | | 370/328 |
| 2016/0112968 | A1 * | 4/2016 | Ahn | H04W 52/38 |
| | | | | 370/311 |
| 2016/0165545 | A1 * | 6/2016 | Ouchi | H04W 52/48 |
| | | | | 455/522 |
| 2016/0165547 | A1 * | 6/2016 | Ouchi | H04L 5/14 |
| | | | | 455/522 |

(Continued)

FOREIGN PATENT DOCUMENTS

| CN | 101911543 A | 12/2010 |
| CN | 108271275 A | 7/2018 |

(Continued)

OTHER PUBLICATIONS

CAICT, A scheme of fallback from 2-step RACH to 4-step RACH, 3GPP TSG RAN WG1 Meeting #96 R1-1902918, Sep. 15, 2019 (Feb. 15, 2019), section 2.

(Continued)

*Primary Examiner* — Kenny S Lin
(74) *Attorney, Agent, or Firm* — Perkins Coie LLP

(57) ABSTRACT

A power control method is provided, which comprises: a terminal receiving first configuration information sent by a network device, the first configuration information being used to determine the power of an uplink data channel in a first message, the first message comprising a preamble and the uplink data channel.

16 Claims, 5 Drawing Sheets

(56) References Cited

U.S. PATENT DOCUMENTS

| | | | |
|---|---|---|---|
| 2016/0183198 A1* | 6/2016 | Xu | H04W 52/241 |
| | | | 455/522 |
| 2016/0242155 A1* | 8/2016 | Xu | H04W 24/08 |
| 2016/0345271 A1* | 11/2016 | Chen | H04W 52/16 |
| 2016/0353440 A1* | 12/2016 | Lee | H04W 72/0453 |
| 2017/0013565 A1* | 1/2017 | Pelletier | H04W 72/0473 |
| 2018/0014257 A1* | 1/2018 | Ouchi | H04W 52/18 |
| 2018/0279376 A1 | 9/2018 | Dinan et al. | |
| 2018/0310257 A1* | 10/2018 | Papasakellariou | H04W 52/242 |
| 2019/0208478 A1* | 7/2019 | Park | H04W 52/367 |
| 2019/0320467 A1 | 10/2019 | Freda et al. | |
| 2020/0040471 A1 | 2/2020 | Okuno et al. | |
| 2020/0045650 A1* | 2/2020 | Suzuki | H04W 52/36 |
| 2021/0105833 A1 | 4/2021 | Freda et al. | |

FOREIGN PATENT DOCUMENTS

| | | | | |
|---|---|---|---|---|
| CN | 108282899 A | | 7/2018 | |
| CN | 108282901 A | | 7/2018 | |
| CN | 108702698 A | | 10/2018 | |
| EP | 2741549 B1 | * | 10/2017 | H04W 52/0206 |
| EP | 3731574 A1 | * | 10/2020 | H04W 52/146 |
| EP | 3626000 B1 | * | 7/2022 | H04L 5/0007 |
| JP | 2013502163 A | | 1/2013 | |
| JP | 2015159573 A | | 9/2015 | |
| WO | 2018064367 A1 | | 4/2018 | |
| WO | 2018151230 A1 | | 8/2018 | |

OTHER PUBLICATIONS

ZTE, Summary of 7.2.1.2 Procedure for Two-step Rach, 3GPP TSG RAN WG1 #96 R1-1903436, Mar. 3, 2019 (Mar. 3, 2019), section 2.4.

NTT Docomo, Inc., On eMBB and URLLC multiplexing for uplink, 3GPP TSG RAN WG1 Meeting #88 R1-1702818, Athens, Greece Feb. 13-17, 2017.

International Search Report in the international application No. PCT/CN2019/077379, mailed on Dec. 3, 2019.

Decision of Re Examination of the Chinese application No. 202010761679.1, issued on Sep. 30, 2022. 29 pages with English translation.

First Office Action of the European application No. 19918416.9, issued on Nov. 2, 2022. 7 pages.

Notice of Rejection of the Chinese application No. 202010761679.1, issued on Mar. 24, 2022. 17 pages with English translation.

Supplementary European Search Report in the European application No. 19918416.9, mailed on Jan. 19, 2022. 9 pages.

First Office Action of the Chinese application No. 202010761679.1, issued on Sep. 27, 2021. 25 pages with English translation.

Second Office Action of the Chinese application No. 202010761679.1, issued on Dec. 22, 2021. 20 pages with English translation.

Written Opinion of the International Search Authority in the international application No. PCT/CN2019/077379, mailed on Dec. 3, 2019. 12 pages with English translation.

3GPP TS 38. 213 V15.3.0(Sep. 2018), 3rd Generation Partnership Project; Technical Specification Group Radio Access Network; NR; Physical layer procedures for control (Release 15).

Decision of Re Examination of the Chinese application No. 202010761679.1, issued on Dec. 29, 2022, pp. 1-53.

Third Office Action of the European application No. 19918416.9, issued on Nov. 10, 2023. 5 pages.

* cited by examiner

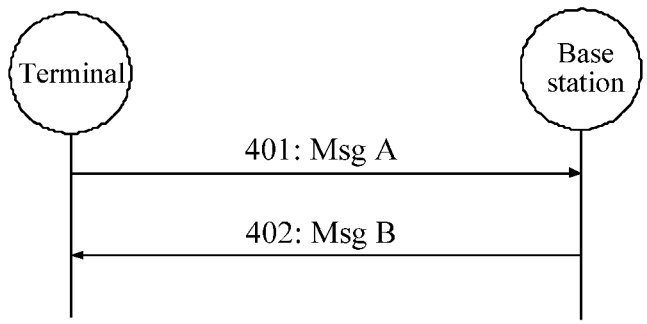

FIG. 4

| A terminal receives first configuration information sent by a network device, the first configuration information being used for determining power of an uplink data channel of a first message, where the first message includes a preamble and the uplink data channel | 501 |

FIG. 5

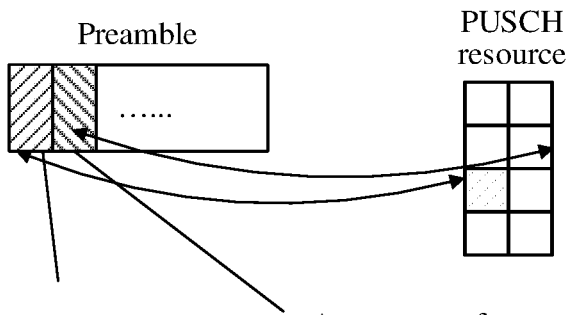

A resource of a preamble 1 is associated with a resource of a PUSCH 1, and the preamble 1 and the PUSCH 1 form a Msg A A resource of a preamble 2 is associated with a resource of a PUSCH 2, and the preamble 2 and the PUSCH 2 form another Msg A

FIG. 6

| After sending a first message to a network device, a terminal receives a second message sent by the network device, where the first message includes a preamble and an uplink data channel, and the second message includes a RAR message and contention resolution information | 701 |

| The terminal determines, based on the second message, whether to fall from a 2-step random access process back to a 4-step random access process | 702 |

FIG. 7

POWER CONTROL METHOD, RANDOM ACCESS METHOD APPARATUSES, AND TERMINAL

CROSS-REFERENCE TO RELATED APPLICATION

This is a continuation application of International Patent Application No. PCT/CN2019/077379, filed on Mar. 7, 2019, the content of which is hereby incorporated by reference in its entirety.

BACKGROUND

A random access process used in a long term evolution (LTE) system is a 4-step random access process. The 4-step random access process in the LTE system is still used in a new radio (NR) system. With the discussion of standardization, the 4-step random access process is considered to be complex and brings a relatively high latency to a terminal. Therefore, a 2-step random access process is provided. However, power control and a processing process of the 2-step random access process still need to be defined.

SUMMARY

Embodiments of the present disclosure relate to the field of mobile communications technologies, and in particular, to a method and an apparatus for power control, a method and an apparatus for random access, and a terminal.

An embodiment of the present disclosure provides a method for power control, including:

receiving, by a terminal, first configuration information sent by a network device, the first configuration information being used for determining power of an uplink data channel of a first message, where the first message includes a preamble and the uplink data channel.

The method for random access provided in this embodiment of the present disclosure includes:

receiving, by a terminal after sending a first message to a network device, a second message sent by the network device, where the first message includes a preamble and an uplink data channel, and the second message includes a RAR message and contention resolution information; and determining, by the terminal, based on the second message, whether to fall from a 2-step random access process back to a 4-step random access process.

The method for random access provided in this embodiment of the present disclosure includes:

after a terminal sends a first message to a network device and when a second message sent by the network device has not been successfully received, transmitting, by the terminal, another first message to the network device, where the first message includes a preamble and an uplink data channel, and the second message includes a RAR message and contention resolution information; and if counts of sending the first message by the terminal to the network device reaches a maximum transmission count, and the terminal still has not successfully received the second message sent by the network device, the terminal falls from a 2-step random access process back to a 4-step random access process.

An embodiment of the present disclosure provides an apparatus for power control, including:

a receiving unit, configured to receive first configuration information sent by a network device, the first configuration information being used for determining power of an uplink data channel of a first message, where the first message includes a preamble and the uplink data channel.

The apparatus for random access provided in this embodiment of the present disclosure includes:

a sending unit, configured to send a first message to a network device;

a receiving unit, configured to receive a second message sent by the network device, where the first message includes a preamble and an uplink data channel, and the second message includes a RAR message and contention resolution information; and a determining unit, configured to determine, based on the second message, whether to fall from a 2-step random access process back to a 4-step random access process.

The apparatus for random access provided in this embodiment of the present disclosure includes:

a communications unit, configured to: after sending a first message to a network device, and when a second message sent by the network device has not been successfully received, transmit another first message to the network device, where the first message includes a preamble and an uplink data channel, and the second message includes a RAR message and contention resolution information; and a fallback unit, configured to: if counts of sending the first message by the communications unit to the network device reaches a maximum transmission count, and the communications unit has not successfully received the second message sent by the network device, fall from a 2-step random access process back to a 4-step random access process.

An embodiment of the present disclosure provides a terminal, including a processor and a memory. The memory is configured to store a computer program, and the processor is configured to invoke the computer program stored in the memory and run the computer program to perform the method for power control or the method for random access.

An embodiment of the present disclosure provides a chip, configured to implement the method for power control or the method for random access.

Specifically, the chip includes: a processor, configured to invoke a computer program from a memory and run the computer program to enable a device having the chip installed therein to perform the method for power control or the method for random access.

An embodiment of the present disclosure provides a computer-readable storage medium, configured to store a computer program, where the computer program enables a computer to perform the method for power control or the method for random access.

An embodiment of the present disclosure provides a computer program product, including a computer program instruction, where the computer program instruction enables a computer to perform the method for power control or the method for random access.

An embodiment of the present disclosure provides a computer program, where when the computer program is run on a computer, the computer is enabled to perform the method for power control or the method for random access.

By means of the foregoing technical solutions, a terminal obtains first configuration information from a network device, so as to determine power of an uplink data channel of a first message based on the first configuration information. Herein, the first message includes a preamble and the uplink data channel, that is, the first message is a Msg A in a 2-step random access process. In this way, the power of the uplink data channel of the Msg A in the 2-step random access process is configured, thereby improving the probability that the Msg A is successfully completely demodulated. In addition, a specific mechanism of falling from the 2-step random access process back to the 4-step random access process is introduced, and the mechanism can be easily implemented and is therefore more compatible with various random access mechanisms.

BRIEF DESCRIPTION OF THE DRAWINGS

The accompanying drawings described herein are used for providing further understanding for the present disclosure and constitute a part of the present disclosure. Exemplary embodiments of the present disclosure and descriptions thereof are used for explaining the present disclosure and do not constitute an improper limitation to the present disclosure. In the accompanying drawings:

FIG. 4 is a flowchart of a 2-step random access process according to an embodiment of the present disclosure;

FIG. 5 is a schematic flowchart of a method for power control according to an embodiment of the present disclosure;

FIG. 6 is a schematic diagram of a Msg A according to an embodiment of the present disclosure;

FIG. 7 is a schematic flowchart 1 of a method for random access according to an embodiment of the present disclosure;

DETAILED DESCRIPTION

The technical solutions in the embodiments of the present disclosure are described in the following with reference to the accompanying drawings in the embodiments of the present disclosure. It is obvious that the described embodiments are some rather than all of the embodiments of the present disclosure. All other embodiments obtained by a person of ordinary skill in the art based on the embodiments of the present disclosure without creative efforts shall fall within the protection scope of the present disclosure.

The technical solutions in the embodiments of the present disclosure can be applied to various communications systems, such as a global system for mobile communications (GSM), a code division multiple access (CDMA) system, a wideband code division multiple access (WCDMA) system, a general packet radio service (GPRS) system, an LTE system, an LTE frequency division duplex (FDD) system, an LTE time division duplex (TDD) system, a universal mobile telecommunications system (UMTS), a worldwide interoperability for microwave access (WiMAX) communications system, or a 5G system.

Figure 1:
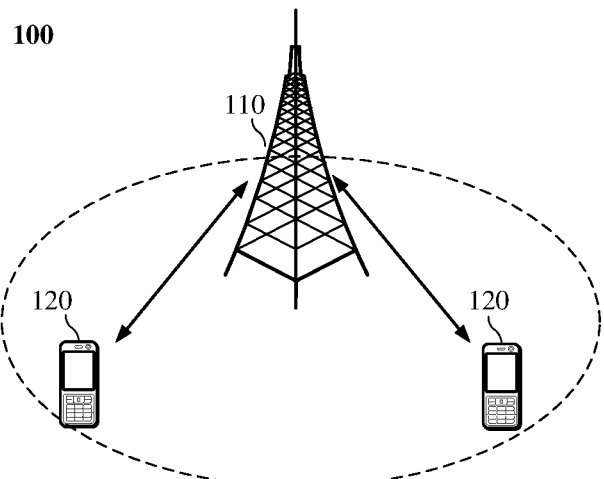
FIG. 1 is a schematic diagram of a communications system architecture according to an embodiment of the present disclosure.

For example, a communications system 100 used in an embodiment of the present disclosure is shown in FIG. 1. The communications system 100 may include a network device 110. The network device 110 may be a device communicating with a terminal 120 (or referred to as a communications terminal or a terminal). The network device 110 may provide communications coverage for a specific geographic area, and may communicate with a terminal located inside the covered area. Optionally, the network device 110 may be a base transceiver station (BTS) in a GSM system or a CDMA system, a NodeB (NB) in a WCDMA system, an evolved NodeB (eNB or eNodeB) in an LTE system, or a wireless controller in a cloud radio access network (CRAN). Alternatively, the network device may be a network side device in a mobile switching center, a relay station, an access point, an in-vehicle device, a wearable device, a hub, a switch, a bridge, a router, or a 5G network, or may be a network device or the like in a future evolved public land mobile network (PLMN).

The communications system 100 further includes at least one terminal device 120 located within the coverage range of the network device 110. The "terminal" used herein includes, but is not limited to: being connected through a wired line, for example, through a public switched telephone network (PSTN), a digital subscriber line (DSL), a digital cable, or a direct cable; and/or another data connection/network; and/or being connected through a wireless interface, for example, through a cellular network, a wireless local area network (WLAN), a digital television network such as a digital video broadcasting-handheld (DVB-H) network, a satellite network, or an AM-FM broadcast transmitter; and/or an apparatus of another terminal that is configured to receive/send communications signals; and/or an Internet of Things (IoT) device. The terminal that is configured to communicate through the wireless interface may be referred to as a "wireless communications terminal", a "wireless terminal", or a "mobile terminal". An example of the mobile terminal includes, but is not limited to, a satellite or a cellular phone; a personal communications system (PCS) terminal that combines a cellular radio telephone, data processing, fax, and data communication capabilities; and may be a personal digital assistant (PDA) including a radio telephone, a beeper, Internet/Intranet access, a web browser, a memo pad, a calendar, and/or a global positioning system (GPS) receiver; and may be a conventional laptop and/or palmtop receiver or another electronic apparatus including a radio telephone transceiver. The terminal may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a PDA, a handheld device having a wireless communication function, a computing device, another processing device connected to a wireless modem, an in-vehicle device, a wearable device, a terminal in a 5G network, a terminal in a future evolved PLMN, or the like.

Optionally, the terminals 120 may perform device to device (D2D) communication with each other.

Optionally, a 5G system or a 5G network may also be referred to as an NR system or an NR network.

FIG. 1 illustratively shows one network device and two terminals. Optionally, the communications system 100 may include a plurality of network devices, and in a coverage area of each network device, another quantity of terminals may be included. This is not limited in the embodiments of the present disclosure.

Optionally, the communications system 100 may further include another network entity such as a network controller or a mobility management entity. This is not limited in the embodiments of the present disclosure.

It should be understood that, in a network/system in the embodiments of the present disclosure, a device having a communication function may be referred to as a communications device. Using the communications system 100 shown in FIG. 1 as an example, the communications device may include a network device 110 and a terminal 120 that have a communications function. The network device 110 and the terminal 120 may be specific devices described above. Details are not described herein again. The communications device may further include other devices, for example, other network entities such as a network controller and a mobility management entity, in the communications system 100. This is not limited in the embodiments of the present disclosure.

It should be understood that, terms "system" and "network" in this specification are usually interchangeably used in this specification. The term "and/or" in this specification is only an association relationship for describing associated objects, and represents that three relationships may exist, for example, A and/or B may represent the following three cases: A exists separately, both A and B exist, and B exists separately. In addition, the character "/" in this specification generally indicates an "or" relationship between the associated objects.

To facilitate the understanding of the technical solutions in the embodiments of the present disclosure, the related technologies in the embodiments of the present disclosure are described below. It should be understood that, the following related technologies can be arbitrarily combined with the technical solutions in the embodiments of the present disclosure to form more varied technical solutions.

A wireless cellular communications network supports most of the mobile broad band (MBB) services and the enhanced services thereof. A main service scenario of the wireless cellular communications network is to provide a wide range of data coverage services for a mobile terminal (for example, a handheld device).

NR is the latest research based on the 3rd generation partnership project (3GPP) standard, the NR supports ultra reliability and low latency communication (URLLC) through a wireless cellular network, and the URLLC communication is a wider machine type communication (MTC)-oriented enhancement. The URLLC better supports applications of transportation, manufacturing, remote control, sports and entertainment, and virtual reality. The feature of low latency of the URLLC is enhanced, which is applicable for an MBB service. The feature of low latency can better serve data users and provide faster access to users, so as to improve the performance of UE and achieve desirable user service experience.

The low latency of the data service is related to the signal processing speed of the terminal/network. However, time sequence definition and process definition in standard specifications also greatly affect the feature of low latency. Some design optimizations are introduced, so that the latency of the NR is greatly reduced compared with that of LTE. The design optimizations thereof are mainly designs on frame structure and hybrid automatic repeat request (HARQ) process. However, the latency performance can involve various channel types applied in an entire communications process. A random access channel (RACH) is a channel that is used for the terminal to initiate an access request. The latency performance of the RACH also needs to be enhanced.

Figure 2:
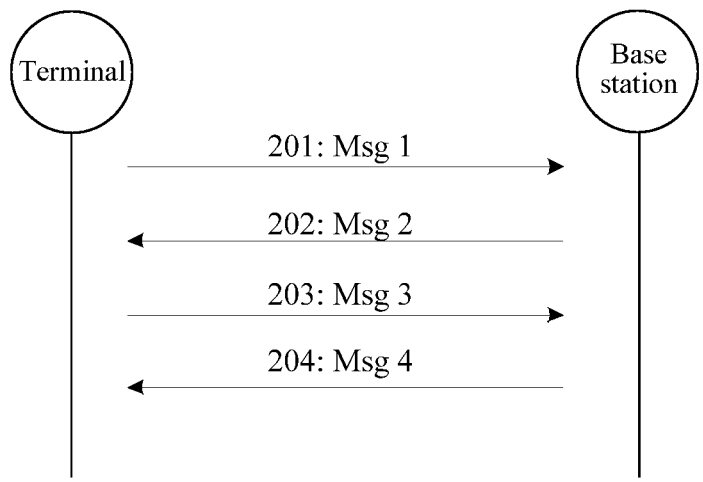
FIG. 2 is a flowchart of a 4-step random access process according to an embodiment of the present disclosure.

A main random access process of the NR is still a conventional 4-step random access process. FIG. 2 shows a flowchart of a 4-step random access process. The base station in FIG. 2 may be an NR base station (that is, gNB), or may be an LTE base station (that is, eNB). As shown in FIG. 2, the 4-step random access process includes the following procedures:

Step 201: A terminal sends a Msg 1 to a base station.

Herein, that a terminal sends a Msg 1 to a base station is that: the terminal sends a preamble to the base station.

Specifically, if the terminal needs to send a preamble, the terminal needs to: (1) select a preamble index; (2) select a physical random access channel (PRACH) resource used for sending the preamble; (3) select a random access-radio network temporary identifier (RA-RNTI); and (4) determine transmission power of the preamble.

Step 202: The base station sends a Msg 2 to the terminal.

Herein, that the base station sends a Msg 2 to the terminal is that: the terminal sends a RAR to the base station.

Specifically, the structure of the RAR is implemented by a MAC protocol data unit (PDU), and the MAC PDU includes a MAC header part and a MAC payload part.

Figure 3:
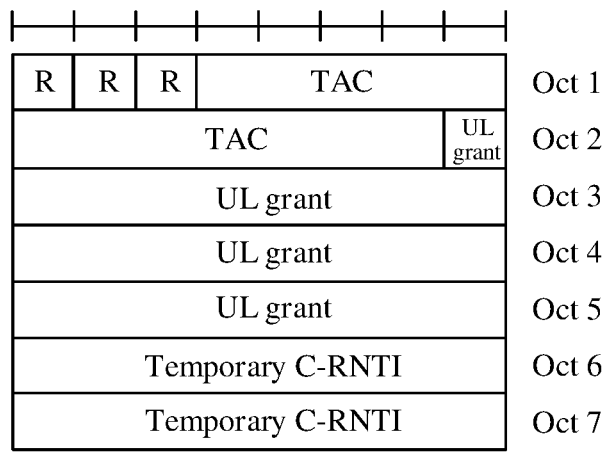
FIG. 3 is a schematic structural diagram of a media access control (MAC) random access response (RAR) according to an embodiment of the present disclosure.

The MAC payload is composed of one or more MAC RARs and possible paddings. If the base station detects random access requests (that is, the Msg 1) from a plurality of terminals at the same time, the base station may respond to the plurality of random access requests by using one MAC PDU. A response to each random access request corresponds to one MAC PDU. The structure of MAC RAR is shown in FIG. 3, where R represents a reserved bit area, may include one or more bits; a timing advance command (TAC) area carries a TA value used for indicating the terminal to perform an uplink synchronization. An uplink grant (UL grant) area is used for indicating a resource for uplink transmission of a Msg 3. A value carried in a temporary cell-radio network temporary identifier (C-RNTI) is used for the terminal to scramble the sent Msg 3 subsequently.

The MAC header is composed of one or more MAC subheaders. However, only one MAC subheader can include a backoff indicator, and the MAC subheader can only be placed at the position of the first subheader. Each of other MAC subheaders without backoff indicators corresponds to one MAC RAR. The MAC subheader carries a random access preamble identifier (RAPID), and the RAPID is a preamble index obtained by the base station when detecting the preamble.

The MAC PDU is transmitted on a physical downlink control channel (PDCCH). The PDCCH is sent to the terminal after being scrambled by the base station by using the RA-RNTI.

Step 203: The terminal sends a Msg 3 to the base station.

Herein, the Msg 3 includes a piece of important information: an identification code of the terminal, the identification code being used for subsequent contention resolution. The terminal sends the Msg 3 on the resource for uplink transmission of the Msg 3 indicated by the Msg 2. Herein, the resource for uplink transmission of the Msg 3 is a physical uplink shared channel (PUSCH).

Step 204: The base station sends a Msg 4 to the terminal.

The base station performs channel estimation. The base station parses out information (including information like an identification code of the terminal) of one of the terminals by using a composite channel result. The base station then sends the Msg 4 (carrying contention resolution information) to the terminal. The Msg 4 can complete the contention resolution to end the random access process.

The foregoing 4-step random access process is relatively complex, and brings a relatively high latency to the random access of the terminal. Therefore, the 2-step random access process is provided. FIG. 4 shows a flowchart of a 2-step random access process. The base station in FIG. 4 may be an NR base station (that is, gNB), or may be an LTE base station (that is, eNB). As shown in FIG. 4, the 2-step random access process includes the following procedures:

Step 401: The terminal sends a Msg A to the base station.

Herein, the Msg 1 and the Msg 3 in the 4-step random access process are combined to form a Msg A in the 2-step random access process. Obviously, the Msg A includes a preamble and a PUSCH.

Step 402: The base station sends a Msg B to the terminal.

Herein, the Msg 2 and the Msg 4 in the 4-step random access process are combined to form a Msg B in the 2-step random access process. Obviously, the Msg B includes a RAR and the contention resolution information.

It should be noted that, the 2-step random access process is applied to various scenarios, including cells of different sizes and different radio resource control (RRC) states, for example, an RRC inactive state, an RRC connected state, and an RRC idle state.

The 2-step random access process defines two types of information structures. One type is the Msg A. The Msg A includes one preamble and a PUSCH. Herein, the preamble and the PUSCH have an association relationship. The other type is the Msg B. The Msg B includes the RAR and the contention resolution information.

The power control and the processing process of the 2-step random access process still need to be defined. The following problems may exist:

1. In the 2-step random access process, the preamble part of the Msg A is a sequence of a low peak-to-average ratio, and is more likely obtained on a base station side. The PUSCH of the Msg A is a channel with a relatively large quantity of bits, and has a lower detection rate than that of the preamble. Therefore, when the two are transmitted in the Msg A, the PUSCH is more prone to a demodulation failure. When Msg A fails to be fully demodulated, retransmission or even an access failure is caused, resulting in a higher latency.

2. The system needs to support both the 2-step random access process and the 4-step random access process. When the Msg A in the 2-step random access process fails to be acquired, the base station needs to fall back to the 4-step random access process at any time. There is no mechanism for the NR to enable a terminal side to distinguish whether the base station has initiated a fallback by receiving a signal. In this case, both mechanisms cannot be adequately used in the network to adapt to various network deployments.

To implement the power control of the 2-step random access process and to implement a mechanism of falling from the 2-step random access process back to the 4-step random access process, the following technical solutions according to the embodiments of the present disclosure are provided.

FIG. 5 is a schematic flowchart of a method for power control according to an embodiment of the present disclosure. As shown in FIG. 5, the method for power control includes the following steps.

Step 501: A terminal receives first configuration information sent by a network device, the first configuration information being used for determining power of an uplink data channel of a first message, where the first message includes a preamble and the uplink data channel.

In the embodiments of the present disclosure, the terminal may be a mobile phone, a notebook computer, a desktop computer, an in-vehicle terminal, a wearable terminal, and any other devices that can communicate with the network.

In the embodiments of the present disclosure, the network device refers to the base station, for example, the NR base station (that is, the gNB), or the LTE base station (that is, the eNB).

In this embodiment of the present disclosure, the terminal may receive the first configuration information sent by the network device by using one of the following methods:

Method 1: The terminal receives a first broadcast message sent by the network device, the first broadcast message carrying the first configuration information.

Herein, for example, the first broadcast message is a system information block (SIB) or remaining minimum system information (RMSI).

It should be noted that, the first broadcast message is provided for all terminals in a cell at which the terminal is located. Therefore, all the terminals in the cell at which the terminal is located receive the first broadcast message.

Method 2: The terminal receives a first unicast message sent by the network device, the first unicast message carrying the first configuration information.

Herein, for example, the first unicast message is RRC dedicated signaling, and the RRC dedicated signaling is provided for the terminal. Therefore, only the terminal receives the first unicast message.

In this embodiment of the present disclosure, the first message includes a preamble and an uplink data channel. Furthermore, the uplink data channel may be a PUSCH. The first message is applied to a 2-step random access process. The procedure of the 2-step random access process is shown in FIG. 4. The first message sent by the terminal to the network device is a Msg A in FIG. 4. The Msg A includes the preamble and the PUSCH.

Herein, the structure shown in FIG. 6 is used for the Msg A. One preamble and one PUSCH have an association relationship. The preamble and the PUSCH having the association relationship form one Msg A. Furthermore, the association relationship between the preamble and the PUSCH may be reflected by at least one of the following parameters: a time parameter, a frequency parameter, a UE identifier (ID), and a preamble ID. For example, if there is an association relationship between the preamble ID and {the time parameter, and the frequency parameter}, there is an association relationship between a preamble corresponding to the preamble ID and a PUSCH corresponding to {the time parameter, and the frequency parameter}. It should be noted that, the preamble of the Msg A is located before the PUSCH in time. That is, the terminal sends the preamble before sending the PUSCH.

In this embodiment of the present disclosure, a terminal determines power of an uplink data channel of a first message by using first configuration information sent by a network device. Specifically, the first configuration information includes at least one power adjustment parameter. The terminal determines the power of the uplink data channel based on the at least one power adjustment parameter and power of the preamble.

In this embodiment of the present disclosure, the power of the preamble is determined based on maximum expected received power of the preamble and an accumulation of a ramping value of the preamble.

The maximum expected received power of the preamble and the ramping value of the preamble are configured by the network device by using a system broadcast message, for example, a SIB or an RMSI. The maximum expected received power of the preamble represents maximum power of the preamble that the base station expects to receive. The ramping value of the preamble represents a power adjustment value of the preamble during retransmission of the preamble (the ramping value may be a positive number or a negative number). The accumulation of the ramping value may be determined based on a quantity of times of transmitting the preamble. The power of the preamble is an accumulation of the maximum expected received power of the preamble and the accumulation of the ramping value of the preamble.

In an implementation of the present disclosure, the at least one power adjustment parameter is used for determining a ratio between the power of the uplink data channel and the power of the preamble. The terminal determines the power of the uplink data channel based on the power of the preamble and the ratio between the power of the uplink data channel and the power of the preamble.

Specifically, the at least one power adjustment parameter includes a first power parameter and a second power parameter. The first power parameter is used for representing a ratio (that is, a ratio between the power of a Msg3 and the power of a preamble) between the power of the uplink data channel and the power of the preamble. The second power parameter is used for representing a ramping value (that is, a ramping value of the PUSCH) of the uplink data channel. In other words, power of the PUSCH of the Msg A is divided by power of the preamble associated with the PUSCH to obtain a particular ratio, and the ratio is jointly determined by a ratio between the power of a Msg 3 and the power of a preamble and the ramping value of the PUSCH.

In the foregoing technical solutions, the first power parameter (that is, the ratio between the power of the Msg A and the power of the preamble) is configured by the network device by using the system broadcast message. For example, the system broadcast message is a SIB or an RMSI. In addition, the first power parameter is used for power control of the uplink data channel of the first message and power control of the uplink data channel in the 4-step random access process.

In the foregoing technical solutions, the second power parameter (that is, the ramping value of the PUSCH) is configured by the network device by using the system broadcast message. For example, the system broadcast message is a SIB or an RMSI. In addition, the second power parameter is merely used for the power control of the uplink data channel of the first message.

The technical solutions in the embodiments of the present disclosure are described below in detail with reference to specific formulas.

The terminal determines the expected received power of the uplink data channel by using the following formula (1):

$$P_{O\_NOMINAL\_PUSCH} = P_{O\_PRE} + \Delta_{PREAMBLE\_PUSCH} + \Delta_{Boost\_PUSCH} \quad (1)$$

where $P_{O\_NOMINAL\_PUSCH}$ represents expected received power of the uplink data channel, $P_{O\_PRE}$ represents expected received power of the preamble, $\Delta_{PREAMBLE\_PUSCH}$ represents the first power parameter (a ratio between the power of a Msg3 and the power of a preamble), and $\Delta_{Boost\_PUSCH}$ represents the second power parameter (that is, the ramping value of the PUSCH).

It should be noted that, a unit of $P_{O\_NOMINAL\_PUSCH}$ and $P_{O\_PRE}$ in the foregoing formula (1) is dBm, and a unit of $\Delta_{PREAMBLE\_PUSCH}$ and $\Delta_{Boost\_PUSCH}$ is dB.

Furthermore, if two dimensions of a carrier and a cell are considered, the foregoing formula (1) may be represented as the following formula (2):

$$P_{O\_NOMINAL\_PUSCH,f,c} = P_{O\_PRE} + \Delta_{PREAMBLE\_PUSCH} + \Delta_{Boost\_PUSCH} \quad (2)$$

where $P_{O\_NOMINAL\_PUSCH,f,c}$ represents expected received power of the uplink data channel, where a subscript f is the carrier, and a subscript c is the cell, $P_{O\_PRE}$ represents expected received power of the preamble, $\Delta_{PREAMBLE\_PUSCH}$ represents the first power parameter (a ratio between the power of a Msg3 and the power of a preamble), and $\Delta_{Boost\_PUSCH}$ represents the second power parameter (that is, the ramping value of the PUSCH).

In the foregoing formula (1) and formula (2), $P_{O\_PRE}$, $\Delta_{PREAMBLE\_PUSCH}$, and $\Delta_{Boost\_PUSCH}$ may be configured by using a high layer. For example, the high layer may be an RRC layer. The RRC layer has a function of broadcasting a system message.

In an implementation of the present disclosure, when the terminal retransmits the first message, the power of the preamble is increased. The terminal determines the power of the uplink data channel based on the at least one power adjustment parameter and the increased power of the preamble.

For example, when the terminal retransmits the Msg A, the formula (1) or the formula (2) may be used to determine the expected received power of the PUSCH. However, $P_{O\_PRE}$ needs to be increased.

In the embodiments of the present disclosure, after the expected received power of the uplink data channel is determined, actual transmission power of the uplink data channel may be determined by using the following formula:

$$P_{PUSCH} = \min\{P_{CMAX,f,c}, P_{O\_NOMINAL\_PUSCH,f,c} + PL_{f,c}\} \quad (3)$$

where $P_{PUSCH}$ represents the actual transmission power of the uplink data channel, $P_{CMAX,f,c}$ represents the maximum transmit power of the first message allowed by the terminal, $P_{O\_NOMINAL\_PUSCH,f,c}$ represents the expected received power of the uplink data channel, and $PL_{f,c}$ represents a path loss measured by the terminal by using a cell reference signal.

Furthermore, in a case 1, when a time interval between the preamble and the uplink data channel of the first message is relatively large, the terminal determines maximum transmit power of the first message by using the following method: using, by the terminal, maximum transmit power of the preamble of the first message as the maximum transmit power of the first message; or using, by the terminal, maximum transmit power of the uplink data channel of the first message as the maximum transmit power of the first message. Furthermore, in a case 2, when a time interval between the preamble and the uplink data channel of the first message is relatively small, the terminal determines the maximum transmit power of the first message by using the following method: using, by the terminal, a minimum value between the maximum transmit power of the preamble and the maximum transmit power of the uplink data channel of the first message as the maximum transmit power of the first message.

FIG. 7 is a schematic flowchart 1 of a method for random access according to an embodiment of the present disclosure. As shown in FIG. 7, the method for random access includes the following steps.

Step 701: After sending a first message to a network device, a terminal receives a second message sent by the network device, where the first message includes a preamble and an uplink data channel, and the second message includes a RAR message and contention resolution information.

In the embodiments of the present disclosure, the terminal may be a mobile phone, a notebook computer, a desktop computer, an in-vehicle terminal, a wearable terminal, and any other devices that can communicate with the network.

In the embodiments of the present disclosure, the network device refers to the base station, for example, the NR base station (that is, the gNB), or the LTE base station (that is, the eNB).

In the embodiments of the present disclosure, the first message includes a preamble and an uplink data channel, and the second message includes a random access response message and contention resolution information. The first message and the second message are applied to a 2-step random access process, and the procedure of the 2-step random access process is shown in FIG. 4. The first message sent by the terminal to the network device is a Msg A in FIG. 4, the Msg A including the preamble and the PUSCH. The second message sent by the network to the terminal is the Msg B in FIG. 4, the Msg B includes the RAR and the contention resolution information.

Step 702: The terminal determines, based on the second message, whether to fall from a 2-step random access process back to a 4-step random access process.

In this embodiment of the present disclosure, after receiving the second message (that is, the Msg B) from the network device in the 2-step random access process, the terminal determines whether to fall from the 2-step random access process back to the 4-step random access process according to the content of the second message.

In this embodiment of the present disclosure, the second message carries first indication information, the first indication information being used for indicating the terminal to continue performing the 2-step random access process or to fall from the 2-step random access process back to the 4-step random access process.

During a specific implementation, a reserved bit area in a MAC RAR in the RAR message carries the first indication information. For example, the structure of the RAR is implemented by using the MAC PDU. The MAC PDU includes a MAC header part and a MAC payload part.

The MAC payload is composed of one or more MAC RARs and possible paddings. If the base station detects random access requests (that is, the Msg 1 or the Msg A) from a plurality of terminals at the same time, the base station may respond to the plurality of random access requests by using one MAC PDU. A response to each random access request corresponds to one MAC PDU. The structure of MAC RAR is shown in FIG. 3, where R represents a reserved bit area, may include one or more bits; a timing advance command (TAC) area carries a TA value used for indicating the terminal to perform an uplink synchronization. An UL grant area is used for indicating a resource for uplink transmission of a Msg 3. A value carried in a temporary C-RNTI is used for the terminal to scramble the sent Msg 3 subsequently. In this embodiment of the present disclosure, the reserved bit area in the MAC RAR is used to carry the first indication information. For example, any bit in the reserved bit area in the MAC RAR is used to carry the first indication information. A value 1 (or 0) of the bit represents continuing to perform the 2-step random access process. A value 0 (1) of the bit represents falling from the 2-step random access process back to the 4-step random access process.

In an implementation of the present disclosure, when the terminal successfully receives the second message, it is determined that the 2-step random access process is completed. Furthermore, that the terminal successfully receives the second message is that: the terminal successfully receives the RAR message and the contention resolution information in the second message, and the RAR message does not carry the first indication information, or the RAR message carries the first indication information, but the first indication information indicates to continue performing the 2-step random access process.

In an implementation of the present disclosure, when the second message has not been successfully received, the terminal retransmits the first message to the network device. That the terminal has not received the second message is that: the terminal cannot parse out the second message; or the terminal has not received the second message before a timer expires.

Figure 8:
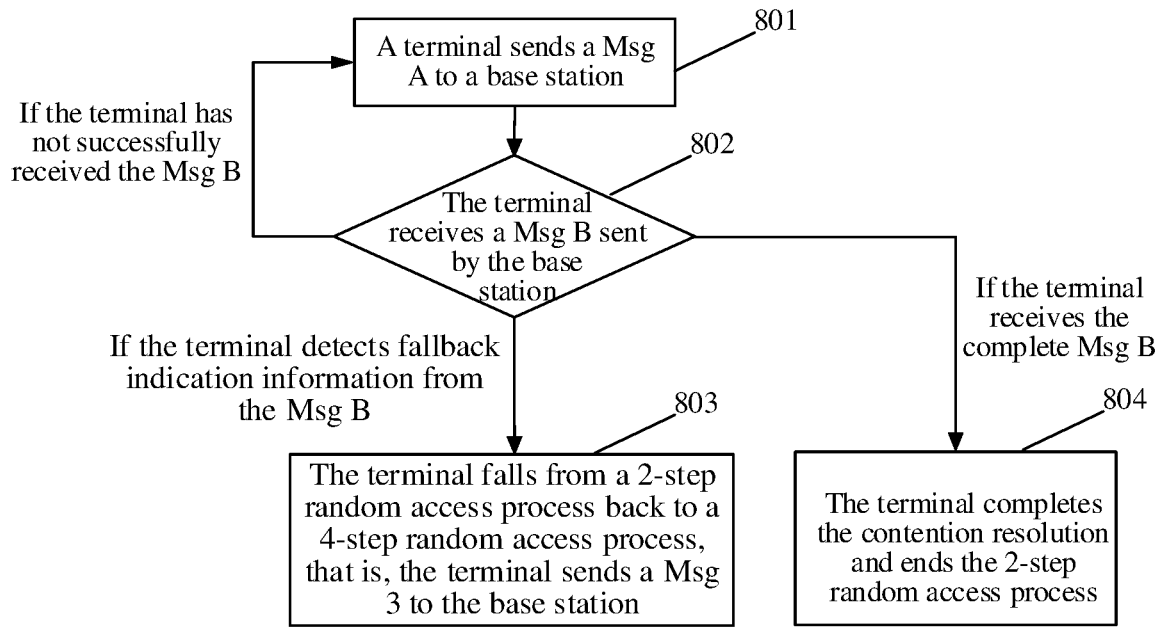
FIG. 8 is a schematic flowchart 2 of a method for random access according to an embodiment of the present disclosure.

FIG. 8 is a schematic flowchart 2 of a method for random access according to an embodiment of the present disclosure. As shown in FIG. 8, the base station in this embodiment corresponds to the foregoing network device, and the method for random access includes the following steps.

Step 801: The terminal sends a Msg A to the base station.

Step 802: The terminal receives a Msg B sent by the base station. Furthermore, if the terminal has not successfully received the Msg B, step 801 is performed again. If the terminal detects fallback indication information from the Msg B, step 803 is performed. If the terminal receives the complete Msg B, step 804 is performed.

Step 803: The terminal falls from a 2-step random access process back to a 4-step random access process, that is, the terminal sends a Msg 3 to the base station.

Step 804: The terminal completes the contention resolution and ends the 2-step random access process.

Figure 9:
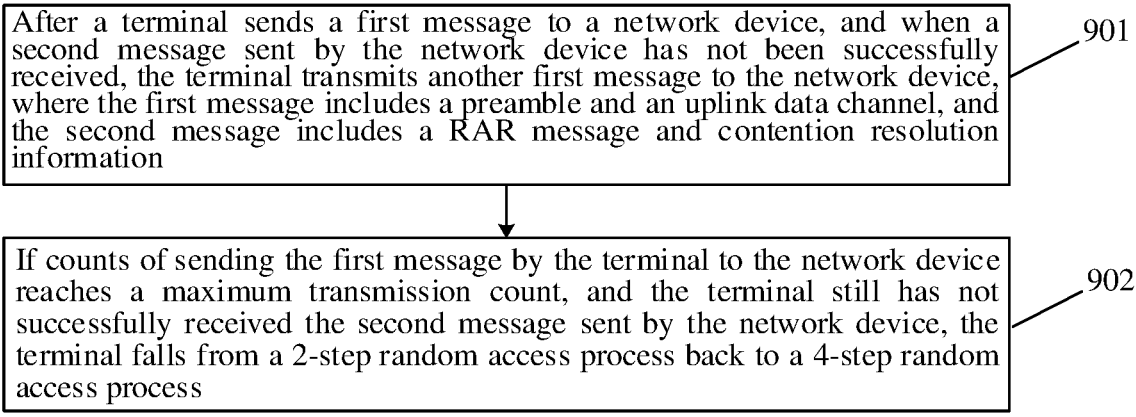
FIG. 9 is a schematic flowchart 3 of a method for random access according to an embodiment of the present disclosure.

FIG. 9 is a schematic flowchart 3 of a method for random access according to an embodiment of the present disclosure. As shown in FIG. 9, the method for random access includes the following steps.

Step 901: After a terminal sends a first message to a network device, and when a second message sent by the network device has not been successfully received, the terminal transmits another first message to the network device, where the first message includes a preamble and an uplink data channel, and the second message includes a RAR message and contention resolution information.

In the embodiments of the present disclosure, the terminal may be a mobile phone, a notebook computer, a desktop computer, an in-vehicle terminal, a wearable terminal, and any other devices that can communicate with the network.

In the embodiments of the present disclosure, the network device refers to the base station, for example, the NR base station (that is, the gNB), or the LTE base station (that is, the eNB).

In the embodiments of the present disclosure, the first message includes a preamble and an uplink data channel, and the second message includes a random access response message and contention resolution information. The first message and the second message are applied to a 2-step random access process, and the procedure of the 2-step random access process is shown in FIG. 4. The first message sent by the terminal to the network device is a Msg A in FIG. 4, the Msg A including the preamble and the PUSCH. The second message sent by the network to the terminal is the Msg B in FIG. 4, the Msg B includes the RAR and the contention resolution information.

Step 902: If counts of sending the first message by the terminal to the network device reaches a maximum transmission count, and the terminal still has not successfully received the second message sent by the network device, the terminal falls from a 2-step random access process back to a 4-step random access process.

In this embodiment of the present disclosure, the terminal can obtain, by using the following method, the maximum transmission count of the first message:

Method 1: The terminal receives a second broadcast message sent by the network device, the second broadcast message carrying the maximum transmission count of the first message.

Herein, for example, the second broadcast message is a SIB or an RMSI. It should be noted that, the second broadcast message is provided for all terminals in a cell at which the terminal is located. Therefore, all the terminals in the cell at which the terminal is located receive the second broadcast message.

Method 2: If the terminal receives RRC dedicated signaling sent by the network device, the RRC dedicated signaling carrying the maximum transmission count of the first message.

Herein, the RRC dedicated signaling is provided for the terminal. Therefore, only the terminal receives the RRC dedicated signaling.

That the second message sent by the network device has not been successfully received is that: the second message has not been received before a timer expires.

In this embodiment of the present disclosure, after falling from the 2-step random access process back to the 4-step random access process, the terminal sends a Msg 1 (that is, a preamble) to the network device, and the procedure of the 4-step random access process shown in FIG. 2 is performed subsequently.

Figure 10:
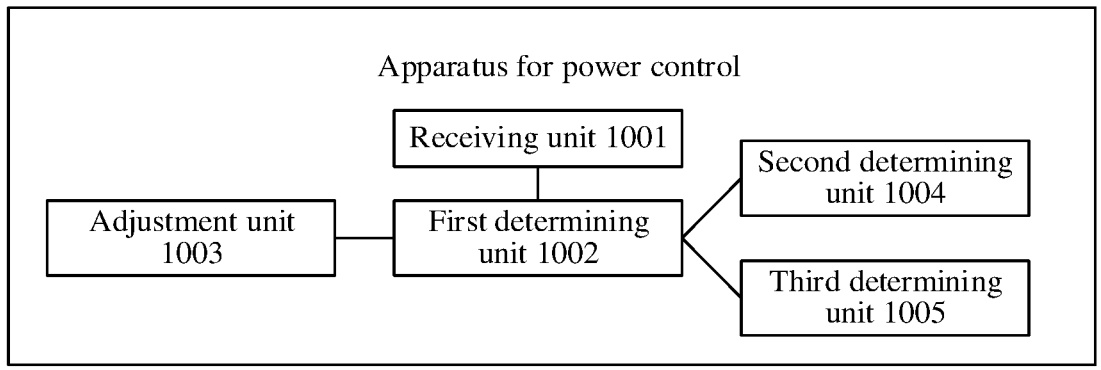
FIG. 10 is a schematic structural composition diagram of an apparatus for power control according to an embodiment of the present disclosure.

FIG. 10 is a schematic structural composition diagram of an apparatus for power control according to an embodiment of the present disclosure. As shown in FIG. 10, the apparatus includes:

a receiving unit 1001, configured to receive first configuration information sent by a network device, the first configuration information being used for determining power of an uplink data channel of a first message, where the first message includes a preamble and the uplink data channel.

In an implementation, the first configuration information includes at least one power adjustment parameter, and the apparatus further includes:

a first determining unit 1002, configured to determine the power of the uplink data channel based on the at least one power adjustment parameter and power of the preamble.

In an implementation, the power of the preamble is determined based on maximum expected received power of the preamble and an accumulation of a ramping value of the preamble.

In an implementation, the at least one power adjustment parameter is used for determining a ratio between the power of the uplink data channel and the power of the preamble; and the first determining unit 1002 is configured to determine the power of the uplink data channel based on the power of the preamble and the ratio between the power of the uplink data channel and the power of the preamble.

In an implementation, the at least one power adjustment parameter includes a first power parameter and a second power parameter, the first power parameter being used for representing a ratio between the power of the uplink data channel and the power of the preamble, and the second power parameter being used for representing a ramping value of the uplink data channel.

In an implementation, the first power parameter is used for power control of the uplink data channel of the first message and power control of the uplink data channel in a 4-step random access process; and the second power parameter is merely used for power control of the uplink data channel of the first message.

In an implementation, the first determining unit 1002 is configured to determine expected received power of the uplink data channel by using the following formula:

$$P_{O\_NOMINAL\_PUSCH} = P_{O\_PRE} + \Delta_{PREAMBLE\_PUSCH} + \Delta_{Boost\_PUSCH}$$

where, $P_{O\_NOMINAL\_PUSCH}$ represents the expected received power of the uplink data channel, $P_{O\_PRE}$ represents the expected received power of the preamble, $\Delta_{PREAMBLE\_PUSCH}$ represents the first power parameter, and $\Delta_{Boost\_PUSCH}$ represents the second power parameter.

In an implementation, the apparatus further includes:

an adjustment unit 1003, configured to increase the power of the preamble during retransmission of the first message, where the first determining unit 1002 is configured to determine the power of the uplink data channel based on the at least one power adjustment parameter and the increased power of the preamble.

In an implementation, the apparatus further includes:

a second determining unit 1004, configured to determine maximum transmit power of the first message by using the following method: using maximum transmit power of the preamble of the first message as the maximum transmit power of the first message; or using maximum transmit power of the uplink data channel of the first message as the maximum transmit power of the first message.

In an implementation, the apparatus further includes:

a third determining unit 1005, configured to determine the maximum transmit power of the first message by using the following method: using a minimum value between the maximum transmit power of the preamble and the maximum transmit power of the uplink data channel of the first message as the maximum transmit power of the first message.

In an implementation, the receiving unit 1001 is configured to receive a first broadcast message sent by the network device, the first broadcast message carrying the first configuration information; or receive the first unicast message sent by the network device, the first unicast message carrying the first configuration information.

In an implementation, the first message is applied to the 2-step random access process.

A person skilled in the art should understand that, for understanding of the related description of the apparatus for power control according to the embodiments of the present disclosure, reference may be made to the related description of the method for power control according to the embodiments of the present disclosure.

Figure 11:
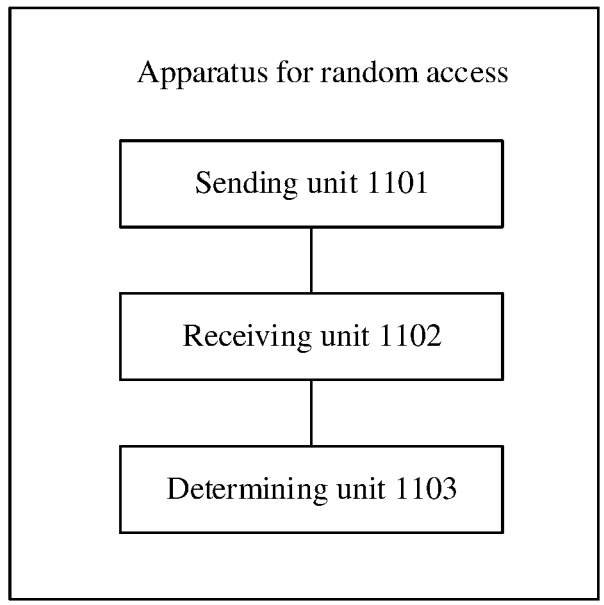
FIG. 11 is a schematic structural composition diagram 1 of an apparatus for random access according to an embodiment of the present disclosure.

FIG. 11 is a schematic structural composition diagram 1 of an apparatus for random access according to an embodiment of the present disclosure. As shown in FIG. 11, the apparatus includes:

a sending unit 1101, configured to send a first message to a network device;

a receiving unit 1102, configured to receive a second message sent by the network device, where the first message includes a preamble and an uplink data channel, and the second message includes a RAR message and contention resolution information; and a determining unit 1103, configured to determine, based on the second message, whether to fall from a 2-step random access process back to a 4-step random access process.

In an implementation, the second message carries first indication information, the first indication information being used for indicating the terminal to continue performing the 2-step random access process or to fall from the 2-step random access process back to the 4-step random access process.

In an implementation, a reserved bit area in a MAC RAR in the RAR message carries the first indication information.

In an implementation, the determining unit 1103 is further configured to determine that the 2-step random access process is completed when the receiving unit successfully receives the second message.

In an implementation, the sending unit 1101 is further configured to retransmit the first message to the network device when the receiving unit has not successfully received the second message.

In an implementation, that the receiving unit 1102 has not successfully received the second message includes:

the receiving unit 1102 fails to parse out the second message; or the receiving unit 1102 has not received the second message before a timer expires.

A person skilled in the art should understand that, for understanding of the related description of the apparatus for random access according to the embodiments of the present disclosure, reference may be made to the related description of the method for random access according to the embodiments of the present disclosure.

Figure 12:
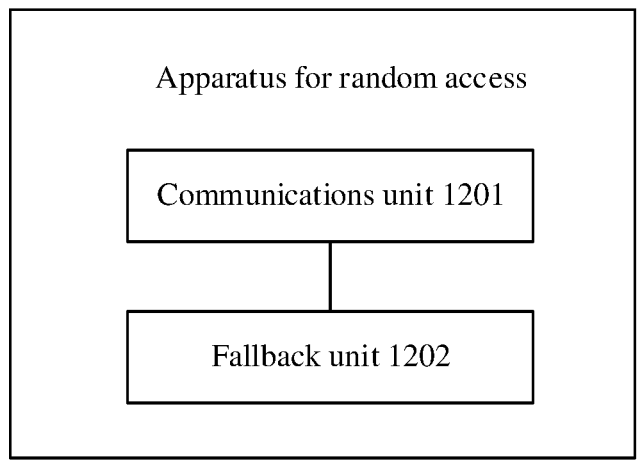
FIG. 12 is a schematic structural composition diagram 2 of an apparatus for random access according to an embodiment of the present disclosure.

FIG. 12 is a schematic structural composition diagram 2 of an apparatus for random access according to an embodiment of the present disclosure. As shown in FIG. 12, the apparatus includes:

a communications unit 1201, configured to: after sending a first message to a network device, and when a second message sent by the network device has not been successfully received, transmit another first message to the network device, where the first message includes a preamble and an uplink data channel, and the second message includes a RAR message and contention resolution information; and a fallback unit 1202, configured to: if counts of sending the first message by the communications unit to the network device reaches a maximum transmission count, and the communications unit has not successfully received the second message sent by the network device, fall from a 2-step random access process back to a 4-step random access process.

In an implementation, the communications unit 1201 is further configured to receive a second broadcast message sent by the network device, the second broadcast message carrying a maximum transmission count of the first message; or receive RRC dedicated signaling sent by the network device, the RRC dedicated signaling carrying the maximum transmission count of the first message.

In an implementation, that the second message sent by the network device has not been successfully received is that: the second message has not been received before a timer expires.

A person skilled in the art should understand that, for understanding of the related description of the apparatus for random access according to the embodiments of the present disclosure, reference may be made to the related description of the method for random access according to the embodiments of the present disclosure.

Figure 13:
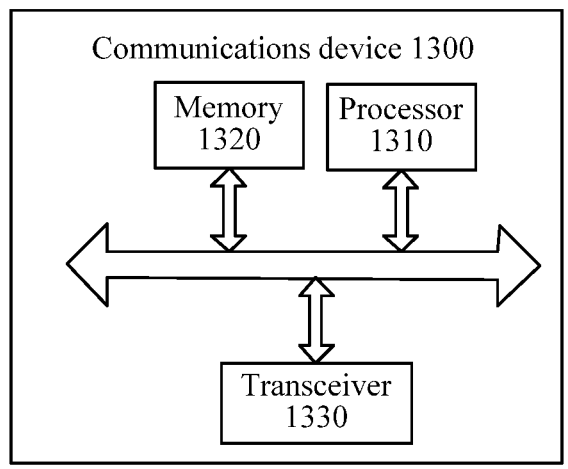
FIG. 13 is a schematic structural diagram of a communications device according to an embodiment of the present disclosure.

FIG. 13 is a schematic structural diagram of a communications device 1300 according to an embodiment of the present disclosure. The communications device may be a terminal, and the communications device 1300 shown in FIG. 13 includes a processor 1310. The processor 1310 may invoke a computer program from a memory and run the computer program, to implement the method in the embodiments of the present disclosure.

Optionally, as shown in FIG. 13, the communications device 1300 may further include a memory 1320. The processor 1310 may invoke the computer program from the memory 1320 and run the computer program, to implement the method in the embodiments of the present disclosure.

The memory 1320 may an independent device independent of the processor 1310, or may be integrated in the processor 1310.

Optionally, as shown in FIG. 13, the communications device 1300 may further include a transceiver 1330, and the processor 1310 may control the transceiver 1330 to communicate with another device. Specifically, the transceiver 1330 may send information or data to another device, or receive information or data sent by another device.

The transceiver 1330 may include a transmitter and a receiver. The transceiver 1330 may further include an antenna, and there may be one or more antennas.

Optionally, the communications device 1300 may be specifically a network device in this embodiment of the present disclosure, and the communications device 1300 may implement corresponding procedures implemented by the network device in various methods in the embodiments of the present disclosure. For brevity, details are not described herein again.

Optionally, the communications device 1300 may be specifically a mobile terminal/terminal in the embodiments of the present disclosure, and the communications device 1300 may implement corresponding procedures implemented by the mobile terminal/terminal in various methods in the embodiments of the present disclosure. For brevity, details are not described herein again.

Figure 14:
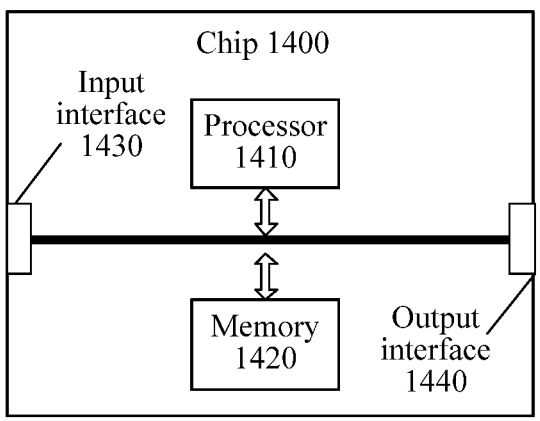
FIG. 14 is a schematic structural diagram of a chip according to an embodiment of the present disclosure.

FIG. 14 is a schematic structural diagram of a chip according to an embodiment of the present disclosure. A chip 1400 shown in FIG. 14 includes a processor 1410. The processor 1410 may invoke a computer program from a memory and run the computer program, to implement the method in the embodiments of the present disclosure.

Optionally, as shown in FIG. 14, the chip 1400 may further include a memory 1420. The processor 1410 may invoke the computer program from the memory 1420 and run the computer program, to implement the method in the embodiments of the present disclosure.

The memory 1420 may an independent device independent of the processor 1410, or may be integrated in the processor 1410.

Optionally, the chip 1400 may further include an input interface 1430. The processor 1410 may control the input interface 1430 to communicate with another device or chip, and specifically, may obtain information or data sent by another device or chip.

Optionally, the chip 1400 may further include an output interface 1440. The processor 1410 may control the output interface 1440 to communicate with another device or chip, and specifically, may output information or data to another device or chip.

Optionally, the chip may be applied to the network device in the embodiments of the present disclosure, and the chip may implement corresponding procedures implemented by the network device in various methods in the embodiments of the present disclosure. For brevity, details are not described herein again.

Optionally, the chip may be applied to a mobile terminal/terminal in the embodiments of the present disclosure, and the chip may implement corresponding procedures implemented by the mobile terminal/terminal in various methods in the embodiments of the present disclosure. For brevity, details are not described herein again.

It should be understood that, the chip mentioned in this embodiment of the present disclosure may also be referred to as a system-level chip, a system chip, a chip system, a system on chip, or the like.

Figure 15:
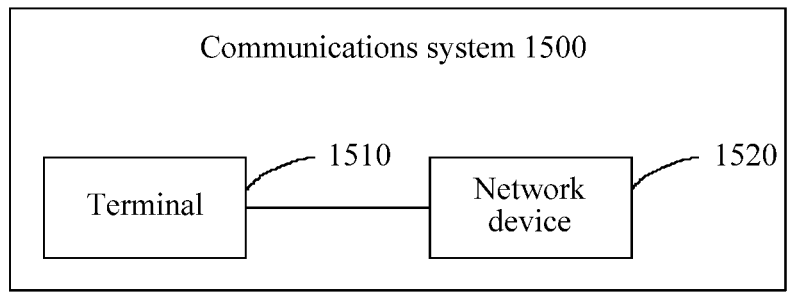
FIG. 15 is a schematic block diagram of a communications system according to an embodiment of the present disclosure.

FIG. 15 is a schematic block diagram of a communications system 1500 according to an embodiment of the present disclosure. As shown in FIG. 15, the communications system 1500 includes a terminal 1510 and a network device 1520.

The terminal 1510 may be configured to implement the corresponding functions implemented by a terminal in the foregoing method, and the network device 1520 may be configured to implement the corresponding functions implemented by a network device in the foregoing method. For brevity, details are not described herein again.

It should be understood that, the processor in this embodiment of the present disclosure may be an integrated circuit chip, and has a signal processing capability. During implementation, the steps of the foregoing method embodiment may be implemented by using a hardware integrated logic circuit in the processor or implemented by using an instruction in a software form. The foregoing processor may be a general-purpose processor, a digital signal processor (DSP), an application-specific integrated circuit (ASIC), a field programmable gate array (FPGA), or another programmable logical device, discrete gate or transistor logical device, or discrete hardware component, and may implement or perform the methods, the steps, and logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly performed or completed by using a hardware decoding processor, or may be performed or completed by using a combination of hardware and a software module in the decoding processor. The software module may be located in a mature storage medium in the art, for example, a random access memory (RAM), a flash memory, a ROM, a programmable ROM, an electrically erasable programmable memory, or a register. The storage medium is located in the memory, and the processor reads information in the memory and completes the steps in the foregoing methods in combination with hardware of the processor.

It can be understood that, the memory in the embodiments of the present disclosure may be a volatile memory or a non-volatile memory, or may include both a volatile memory and a non-volatile memory. The non-volatile memory may be a read-only memory (ROM), a programmable ROM (PROM), an erasable programmable ROM (EPROM), an electrically EPROM (EEPROM), or a flash memory. The volatile memory may be a RAM, and is used as an external cache. Through exemplary but not limitative description, RAMs in many forms may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that, the memory for the system and the method described herein intends to include, but not limited to, the memories and any other suitable types of memories.

It should be understood that, the foregoing description of the memory is illustrative, but is not limitative. For example, the memory in the embodiments of the present disclosure may be alternatively a static RAM (SRAM), a dynamic RAM (DRAM), a synchronous DRAM (SDRAM), a double data rate SDRAM (DDR SDRAM), an enhanced SDRAM (ESDRAM), a synchlink SDRAM (SLDRAM), a direct rambus RAM (DR RAM), or the like. That is, the memory described in this embodiment of the present disclosure intends to include, but not limited to, the memories and any other suitable types of memories.

An embodiment of the present disclosure further provides a computer-readable storage medium, configured to store a computer program.

Optionally, the computer-readable storage medium may be applied to the network device in the embodiments of the present disclosure, and the computer program enables a computer to perform corresponding procedures implemented by the network device in the methods in the embodiments of the present disclosure. For brevity, details are not described herein again.

Optionally, the computer-readable storage medium may be applied to the network device in the mobile terminal/terminal in the embodiments of the present disclosure, and the computer program enables a computer to perform corresponding procedures implemented by the mobile terminal/terminal in the methods in the embodiments of the present disclosure. For brevity, details are not described herein again.

An embodiment of the present disclosure further provides a computer program product, including a computer program instruction.

Optionally, the computer program product may be applied to the network device in the embodiments of the present disclosure, and the computer program instruction enables a computer to perform corresponding procedures implemented by the network device in the methods in the embodiments of the present disclosure. For brevity, details are not described herein again.

Optionally, the computer program product may be applied to the mobile terminal/terminal in the embodiments of the present disclosure, and the computer program instruction enables a computer to perform corresponding procedures implemented by the mobile terminal/terminal in the methods in the embodiments of the present disclosure. For brevity, details are not described herein again.

An embodiment of the present disclosure further provides a computer program.

Optionally, the computer program may be applied to the network device in the embodiments of the present disclosure, and when the computer program is run on the computer, the computer is enabled to perform corresponding procedures implemented by the network device in the methods in the embodiments of the present disclosure. For brevity, details are not described herein again.

Optionally, the computer program may be applied to the network device in the mobile terminal/terminal in the embodiments of the present disclosure, and when the computer program is run on the computer, the computer is enabled to perform corresponding procedures implemented by the mobile terminal/terminal in the methods in the embodiments of the present disclosure. For brevity, details are not described herein again.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may exist alone physically, or two or more units are integrated into one unit.

If implemented in the form of software functional units and sold or used as an independent product, the functions may also be stored in a computer-readable storage medium. Based on such an understanding, the technical solutions of the present disclosure essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiments of the present disclosure. The foregoing storage medium includes: any medium that can store program code, such as a universal serial bus (USB) flash disk, a removable hard disk, a ROM, a RAM, a magnetic disk, or an optical disc.

The descriptions are only specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

The invention claimed is:

1. A method for power control, comprising:
receiving, by a terminal, first configuration information sent by a network device, the first configuration information being used for determining power of an uplink data channel of a first message, wherein the first message comprises a preamble and the uplink data channel, the first configuration information comprises at least one power adjustment parameter, and the method further comprises:
determining, by the terminal, the power of the uplink data channel based on the at least one power adjustment parameter and power of the preamble, wherein the at least one power adjustment parameter is used for determining a ratio between the power of the uplink data channel and the power of the preamble, wherein
determining, by the terminal, the power of the uplink data channel based on the at least one power adjustment parameter and the power of the preamble comprises:
determining, by the terminal, the power of the uplink data channel based on the power of the preamble and the ratio between the power of the uplink data channel and the power of the preamble.

2. The method according to claim 1, wherein the power of the preamble is determined based on an expected received power of the preamble and an accumulation of a ramping value of the preamble.

3. The method according to claim 1, wherein the at least one power adjustment parameter comprises a first power parameter and a second power parameter, the first power parameter being used for representing the ratio between the power of the uplink data channel and the power of the preamble, and the second power parameter being used for representing a ramping value of the uplink data channel.

4. The method according to claim 3, wherein determining, by the terminal, the power of the uplink data channel based on the power of the preamble and the ratio between the power of the uplink data channel and the power of the preamble comprises:
determining, by the terminal, an expected received power of the uplink data channel by using the following formula:

$$P_{O\_NOMINAL\_PUSCH} = P_{O\_PRE} + \Delta_{PREAMBLE\_PUSCH} + \Delta_{Boost\_PUSCH} \quad (1)$$

wherein, $P_{O\_NOMINAL\_PUSCH}$ represents the expected received power of the uplink data channel, $P_{O\_PRE}$ represents an expected received power of the preamble, $\Delta_{PREAMBLE\_PUSCH}$ represents the first power parameter, and $\Delta_{Boost\_PUSCH}$ represents the second power parameter.

5. A method for power control, comprising:
- sending, by a network device, first configuration information to a terminal, the first configuration information being used for determining power of an uplink data channel of a first message, wherein the first message comprises a preamble and the uplink data channel, the first configuration information comprises at least one power adjustment parameter, and the power of the uplink data channel is determined based on the at least one power adjustment parameter and power of the preamble, wherein
- the at least one power adjustment parameter is used for determining a ratio between the power of the uplink data channel and the power of the preamble, and the power of the uplink data channel is determined based on the power of the preamble and the ratio between the power of the uplink data channel and the power of the preamble.

6. The method according to claim 5, wherein the power of the preamble is determined based on an expected received power of the preamble and an accumulation of a ramping value of the preamble.

7. The method according to claim 5, wherein the at least one power adjustment parameter comprises a first power parameter and a second power parameter, the first power parameter being used for representing the ratio between the power of the uplink data channel and the power of the preamble, and the second power parameter being used for representing a ramping value of the uplink data channel.

8. The method according to claim 7, wherein the operation that the power of the uplink data channel is determined based on the power of the preamble and the ratio between the power of the uplink data channel and the power of the preamble comprises that:
- an expected received power of the uplink data channel is determined by using the following formula:

$$P_{O\_NOMINAL\_PUSCH} = P_{O\_PRE} + \Delta_{PREAMBLE\_PUSCH} + \Delta_{Boost\_PUSCH} \quad (1)$$

wherein, $P_{O\_NOMINAL\_PUSCH}$ represents the expected received power of the uplink data channel, $P_{O\_PRE}$ represents an expected received power of the preamble, $\Delta_{PREAMBLE\_PUSCH}$ represents the first power parameter, and $\Delta_{Boost\_PUSCH}$ represents the second power parameter.

9. An apparatus for power control, comprising:
- a transceiver, configured to receive first configuration information sent by a network device, the first configuration information being used for determining power of an uplink data channel of a first message, wherein the first message comprises a preamble and the uplink data channel, the first configuration information comprises at least one power adjustment parameter, and the apparatus further comprises:
- a processor, configured to determine the power of the uplink data channel based on the at least one power adjustment parameter and power of the preamble, wherein the at least one power adjustment parameter is used for determining a ratio between the power of the uplink data channel and the power of the preamble; and
- the processor is further configured to determine the power of the uplink data channel based on the power of the preamble and the ratio between the power of the uplink data channel and the power of the preamble.

10. The apparatus according to claim 9, wherein the power of the preamble is determined based on an expected received power of the preamble and an accumulation of a ramping value of the preamble.

11. The apparatus according to claim 9, wherein the at least one power adjustment parameter comprises a first power parameter and a second power parameter, the first power parameter being used for representing the ratio between the power of the uplink data channel and the power of the preamble, and the second power parameter being used for representing a ramping value of the uplink data channel.

12. The apparatus according to claim 11, wherein the processor is configured to determine an expected received power of the uplink data channel by using the following formula:

$$P_{O\_NOMINAL\_PUSCH} = P_{O\_PRE} + \Delta_{PREAMBLE\_PUSCH} + \Delta_{Boost\_PUSCH} \quad (1)$$

wherein, $P_{O\_NOMINAL\_PUSCH}$ represents the expected received power of the uplink data channel, $P_{O\_PRE}$ represents an expected received power of the preamble, $\Delta_{PREAMBLE\_PUSCH}$ represents the first power parameter, and $\Delta_{Boost\_PUSCH}$ represents the second power parameter.

13. An apparatus for power control, comprising:
- a transceiver, configured to send first configuration information to a terminal, the first configuration information being used for determining power of an uplink data channel of a first message, wherein the first message comprises a preamble and the uplink data channel, the first configuration information comprises at least one power adjustment parameter, and the power of the uplink data channel is determined based on the at least one power adjustment parameter and power of the preamble, wherein
- the at least one power adjustment parameter is used for determining a ratio between the power of the uplink data channel and the power of the preamble, and the power of the uplink data channel is determined based on the power of the preamble and the ratio between the power of the uplink data channel and the power of the preamble.

14. The apparatus according to claim 13, wherein the power of the preamble is determined based on an expected received power of the preamble and an accumulation of a ramping value of the preamble.

15. The apparatus according to claim 13, wherein the at least one power adjustment parameter comprises a first power parameter and a second power parameter, the first power parameter being used for representing the ratio between the power of the uplink data channel and the power of the preamble, and the second power parameter being used for representing a ramping value of the uplink data channel.

16. The apparatus according to claim 15, wherein the operation that the power of the uplink data channel is determined based on the power of the preamble and the ratio between the power of the uplink data channel and the power of the preamble comprises that:
- an expected received power of the uplink data channel is determined by using the following formula:

$$P_{O\_NOMINAL\_PUSCH} = P_{O\_PRE} + \Delta_{PREAMBLE\_PUSCH} + \Delta_{Boost\_PUSCH} \quad (1)$$

wherein, $P_{O\_NOMINAL\_PUSCH}$ represents the expected received power of the uplink data channel, $P_{O\_PRE}$ represents an expected received power of the preamble, $\Delta_{PREAMBLE\_PUSCH}$ represents the first power parameter, and $\Delta_{Boost\_PUSCH}$ represents the second power parameter.

\* \* \* \* \*